United States Patent
Wang (10) Patent No.: US 10,176,826 B2
(45) Date of Patent: Jan. 8, 2019

(54) SEPARATING AUDIO SOURCES

(71) Applicant: DOLBY LABORATORIES LICENSING CORPORATION, San Francisco, CA (US)

(72) Inventor: Jun Wang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/549,651

(22) PCT Filed: Feb. 11, 2016

(86) PCT No.: PCT/US2016/017591
§ 371 (c)(1),
(2) Date: Aug. 8, 2017

(87) PCT Pub. No.: WO2016/133785
PCT Pub. Date: Aug. 25, 2016

(65) Prior Publication Data
US 2018/0240470 A1 Aug. 23, 2018

Related U.S. Application Data

(60) Provisional application No. 62/121,125, filed on Feb. 26, 2015.

(30) Foreign Application Priority Data

Feb. 16, 2015 (CN) .......................... 2015 1 0085195

(51) Int. Cl.
*G10L 21/028* (2013.01)
*G10L 19/008* (2013.01)
(Continued)

(52) U.S. Cl.
CPC .......... *G10L 21/028* (2013.01); *G06F 3/0484* (2013.01); *G06F 3/16* (2013.01);
(Continued)

(58) Field of Classification Search
CPC ... G10L 19/008; G10L 21/028; G06F 3/0484; G06F 3/16; G06F 3/165; G06F 3/167;
(Continued)

(56) References Cited

U.S. PATENT DOCUMENTS 6,799,170 B2 9/2004 Lee
7,295,972 B2 11/2007 Choi
(Continued)

FOREIGN PATENT DOCUMENTS

CN 105336332 2/2016
WO 2014/147442 9/2014
(Continued)

OTHER PUBLICATIONS

Arberet et al. "A Robust Method to Count and Locate Audio Sources in a Multichannel Underdetermined Mixture", Jan. 2010, IEEE Transactions on Signal Processing, vol. 58, No. 1. all pages. (Year: 2010).*

(Continued)

*Primary Examiner* — Jesse A Elbin (57) ABSTRACT

Example embodiments disclosed herein relate to source separation in audio content. A method for separating sources from audio content is disclosed, the audio content being of a multi-channel format based on a plurality of channels. The method comprises performing a component analysis on the audio content for each of the plurality of channels to generate a plurality of components, each of the plurality of components comprising a plurality of time-frequency tiles in full frequency band; generating at least one dominant source with at least one of the time-frequency tiles from the (Continued)

plurality of the components and separating the sources from the audio content by estimating spatial parameters and spectral parameters based on the dominant source. Corresponding system and computer program product are also disclosed.

19 Claims, 3 Drawing Sheets

(51) Int. Cl.
*G06F 3/16* (2006.01)
*G06F 3/0484* (2013.01)

(52) U.S. Cl.
CPC ............ *G10L 19/008* (2013.01); *G06F 3/165* (2013.01); *G06F 3/167* (2013.01); *G10H 2210/305* (2013.01)

(58) Field of Classification Search
CPC ....... G10H 2210/295; G10H 2210/301; G10H 2210/305
USPC .......................................................... 700/94
See application file for complete search history.

(56) References Cited

U.S. PATENT DOCUMENTS

| | | | |
|---|---|---|---|
| 7,565,213 B2* | 7/2009 | Dittmar | .................. G10L 25/48 700/94 |
| 7,567,845 B1 | 7/2009 | Avendano | |
| 8,239,052 B2 | 8/2012 | Itoyama | |
| 8,340,437 B2 | 12/2012 | Abramoff | |
| 8,379,868 B2 | 2/2013 | Goodwin | |
| 8,682,675 B2 | 3/2014 | Togami | |
| 9,940,546 B2* | 4/2018 | Hoh | ........................ G06K 9/624 |
| 2009/0252341 A1 | 10/2009 | Goodwin | |
| 2009/0254338 A1 | 10/2009 | Chan | |
| 2010/0125352 A1 | 5/2010 | Yamada | |
| 2010/0138010 A1 | 6/2010 | Aziz Sbai | |
| 2010/0174389 A1 | 7/2010 | Blouet | |
| 2011/0282658 A1 | 11/2011 | Wang | |
| 2012/0045066 A1 | 2/2012 | Nakadai | |
| 2012/0114126 A1 | 5/2012 | Thiergart | |
| 2013/0010968 A1 | 1/2013 | Yagi | |
| 2013/0308790 A1 | 11/2013 | Claussen | |
| 2014/0119545 A1 | 5/2014 | Uhle | |
| 2014/0119551 A1 | 5/2014 | Bharitkar | |
| 2017/0178664 A1* | 6/2017 | Wingate | ................ G10L 21/028 |
| 2017/0206907 A1 | 7/2017 | Wang | |
| 2017/0243113 A1* | 8/2017 | Fukuda | ................ G06N 3/0472 |

FOREIGN PATENT DOCUMENTS

| | | |
|---|---|---|
| WO | 2014/195132 | 12/2014 |
| WO | 2014/204997 | 12/2014 |

OTHER PUBLICATIONS

Sanggyun K. et al., "Underdetermined Blind Source Separation Based on Subspace Representation", IEEE Transactions on Signal Processing, vol. 57, No. 7, pp. 2604-2614, Jul. 2009.

Fevotte C. et al., "Notes on nonnegative tensor factorization of the spectrogram for audio source separation: statistical insights and towards self-clustering of the spatial cues", 7th International Symposium on Computer Music Modeling and Retrieval (CMMR 2010) Malaga, Spain, pp. 102-115, Oct. 2010.

Belouchrani A. et al., "Blind source separation based on time-frequency signal representations", IEEE Transactions on Signal Processing, vol. 46, No. 11, pp. 2888-2897, Nov. 1998.

Benaroya L. et al., "Wiener based source separation with HMM/GMM using a single sensor", 4th International Symposium on Independent component analysis and Blind Signal Separation (ICA2003), pp. 957-961, Apr. 2003.

Fevotte C. et al., "Nonnegative matrix factorization with the Itakura-Saito divergence. With application to music analysis", Neural Comput., vol. 21, No. 3, pp. 793-830, Mar. 2009.

Ozerov A. et al., "Multichannel Nonnegative Matrix Factorization in convolutive mixtures for audio source separation", IEEE Trans on Audio, speech, and language processing, vol. 18, No. 3, Mar. 2010.

Hyvarinen E. et al., "Independent Component Analysis: Algorithms and Applications", Neural Networks, 13(4-5): 411-430, 2000.

Ewert S. et al., "Using Score-informed Constraints for NMF-based Source Separation", ICASSP, 2012.

Guopeng W. et al., "Blind Estimation of Mixing Matrix for Weak Time-Frequency Orthogonality Property", CNKI vol. 25, No. 1, XP002757209, pp. 1-2, Jan. 31, 2010. Abstract. Complete article published in the Journal of Data Acquisition & Processing Issue 1, pp. 18-22,Jan. 2010.

Arberet S. et al., "Blind Spectral-GMM Estimation for Undetermined Instantaneous Audio Source Separation", Independent Component Analysis and Signal Separation: 8th International Conference ICA 2009 Paraty Brazil, pp. 751-758, XP019115475, Mar. 15-18, 2009.

Zhang Y. et al., "Sparse Source Separation with Unknown Source Number", Advances in Swarm Intelligence, Springer Berlin Heidelberg, pp. 167-172, XP019143654, Jun. 12, 2010.

\* cited by examiner

SEPARATING AUDIO SOURCES

CROSS REFERENCE TO RELATED APPLICATIONS

This application claims priority to Chinese Patent Application No. 201510085195.9, filed on Feb. 16, 2015 and U.S. Provisional Patent Application No. 62/121,125, filed on Feb. 26, 2015, each of which is hereby incorporated by reference in its entirety.

TECHNOLOGY

Example embodiments disclosed herein generally relate to audio content processing, and more specifically, to a method and system for separating sources from audio content of a multi-channel format.

BACKGROUND

Traditionally, audio content of multi-channel format (e.g., stereo, 5.1, 7.1, and the like) are created by mixing different audio signals in a studio, or generated by recording acoustic signals simultaneously in a real environment. The mixed audio signal or content may include a number of different sources. Source separation is a task to identify information of each of the sources in order to reconstruct the audio content, for example, by a mono signal and metadata including spatial information, spectral information, and the like.

When recording an auditory scene using one or more microphones, it is preferred that the sound source dependent information be separated such that it may be suitable for use among a variety of subsequent audio processing tasks. Some examples may include, spatial audio coding, remixing/re-authoring, 3D sound analysis and synthesis, signal enhancement/noise suppression for a variety of purposes (e.g., automatic speech recognition). Therefore, improved versatility and better performance can be achieved by a successful source separation. When no prior information of the sources involved in the capturing process is available (for instance, the properties of the recording devices, the acoustic properties of the room, and the like), the separation process can be called blind source separation (BSS).

Conventionally, some statistical models for source separation such as Gaussian Mixture Model (GMM) and Non-negative Matrix Factorization (NMF) have been widely applied in order to realize source separation. However, these algorithms (e.g., GMM or NMF model), only convergence to a stationary point of the objective function. Accordingly, these algorithms are sensitive to parameter initialization in terms of the following aspects: 1) the final result depends strongly on the parameter initialization; 2) the convergence speed varies significantly depending on the parameter initialization; and 3) the algorithms cannot identify the actual number of source signals, so they usually require prior information such as source number, spectral base, and the like. In a conventional system, original source information is used for oracle initializations, which is not practical for most real-world applications because such information is usually not available. Moreover, in some applications, training data may be required. However difficulties arises in practice due to the fact that the source models which are learned from training data tend to perform poorly in realistic cases. This is due to the fact that there is generally a mismatch between the models and the actual properties of the sources in the mix.

In view of the foregoing, there is a need in the art for a solution for separating sources from audio content without knowing any prior information.

SUMMARY

In order to address the foregoing and other potential problems, example embodiments disclosed herein proposes a method and system for separating sources from audio content.

In one aspect, example embodiments disclosed herein provide a method for separating sources from audio content, the audio content being of a multi-channel format based on a plurality of channels. The method includes performing a component analysis on the audio content for each of the plurality of channels to generate a plurality of components. Each of the plurality of components comprising a plurality of time-frequency tiles in full frequency band, generating at least one dominant source with at least one of the time-frequency tiles from the plurality of the components and separating the sources from the audio content by estimating spatial parameters and spectral parameters based on the dominant source. Embodiments in this regard further include a corresponding computer program product.

In another aspect, example embodiments disclosed herein provide a system for separating sources from audio content, the audio content being of a multi-channel format based on a plurality of channels. The system includes a component analysis unit configured to perform a component analysis on the audio content for each of the plurality of channels to generate a plurality of components. Each of the plurality of components comprising a plurality of time-frequency tiles in full frequency band, a source generating unit configured to generate at least one dominant source with at least one of the time-frequency tiles from the plurality of the components and a source separating unit configured to separate the sources from the audio content by estimating spatial parameters and spectral parameters based on the dominant source.

Through the following description, it would be appreciated that in accordance with example embodiments disclosed herein, one or several dominant sources can be separated from the audio content. The separated sources from the audio content are advantageous, because such a separation does not require prior information of the sources or audio content, (e.g., the separation is purely based on blind source separation). The reconstructed sources with metadata such as spatial information can be precisely played in any playback system, regardless of the number of transducers (e.g., stereo system, 5.1, 7.1 system or the like). In addition, the reconstructed sources with metadata is easily manipulated and improved in post-processing stages, and as a result, representation of the audio content in almost every acoustic system (even a headphone) can be adapted to be accurate, and thus immersive. Other advantages achieved by the example embodiments disclosed herein will become apparent through the following descriptions.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DESCRIPTION OF EXAMPLE EMBODIMENTS

Principles of the example embodiments disclosed herein will now be described with reference to various example embodiments illustrated in the drawings. It should be appreciated that the depiction of these embodiments is only to enable those skilled in the art to better understand and further implement the example embodiments disclosed herein, not intended for limiting the scope in any manner.

The example embodiments disclosed herein assumes that the audio content as input is in a multi-channel format, for example, 5.1, 7.1, or stereo format. In other words, there are at least two channels provided for the audio content. A multi-channel audio content can be processed into a plurality of mono audio contents with metadata such as spatial information of sources. Different from conventional ways to separate sources from the original audio content which requires prior information such as the number of sources, spectral information, and the like, the example embodiments disclosed herein intends to realize the source separation without any prior information, for example, blind source separation (BSS). The blind source separation in the case of spatial audio captures consists of decomposing the multi-channel mixture signal into source signals and representing information about the mixing parameters and spatial positions of the sources.

In order to achieve the blind source separation, example embodiments disclosed herein proposes a method and system for separating sources from audio content. The audio content includes sources of a multi-channel format. Embodiments will be given in the following.

The example embodiments disclosed herein includes audio content with I-channel input, and the audio content can be expressed as $x_i(t)$, $i=1, \ldots, I$, $t=1, \ldots T$. The audio can be processed in its Short-time Fourier transform (STFT) domain, so that $X_{fn}=[x_{1,fn}, \ldots, x_{1,fn}]^T$, where $f=1, \ldots, F$ is a frequency bin index, and $n=1, \ldots, N$ is a time frame index. The mixing model of the audio content can be presented in a matrix form as:

$$X_{fn}=C_{fn}s_{fn}+b_{fn} \quad (1)$$

where $s_{fn}=[s_{1,fn}, \ldots, s_{j,fn}, \ldots, s_{J,fn}]^T$ represents spectral parameters which denotes STFTs of J sources, $C_{fn}=[c_{ij,fn}]_{ij}$ represents spatial parameters which can be frequency-dependent and time-varying, and $b_{fn}=[b_{1,fn}, \ldots, b_{1,fn}]^T$ represents additive noise.

Equation (1) explains that the audio content can be described by parameters such as spectral parameters and spatial parameters, and also some noises.

Figure 1:
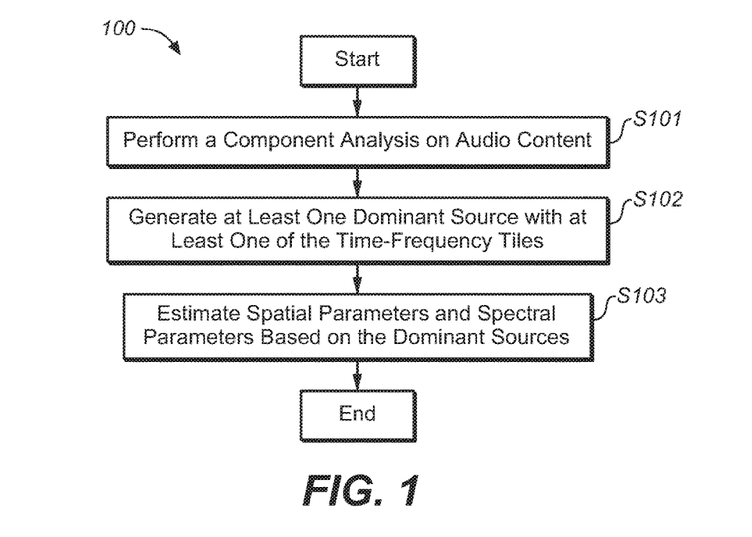
FIG. 1 illustrates a flowchart of a method for separating sources from audio content in accordance with an example embodiment.

Reference is first made to FIG. 1 which shows a flowchart of a method 100 for separating sources from audio content in accordance with example embodiments of the present invention.

In one example embodiment disclosed herein, at step S101, a component analysis on audio content is performed. It should be noted that there can be a number of component analysis approaches utilized to perform the step S101, by way of example only, such approaches may include, but not limited to, principal component analysis (PCA), independent component analysis (ICA), B-format analysis, and the like.

In one example embodiment disclosed herein, PCA approach is adopted, which is illustrated in detail as below. Principal component analysis (PCA) enables the original coordinate system to be rotated such that axes of the new coordinate system point into directions of the highest variance of the data. The axes or new variables are termed principal components and are ordered by variance: the first component represents the direction of the highest variance of the data, while the direction of the second component represents the highest of the remaining variance orthogonal to the first component. This can be naturally extended to obtain the required number of components which together span a component space covering the desired amount of variance. Since components describe specific directions relative to the original coordinate system, each component depends by certain amounts on each of the original variables: each component is a linear combination of all original variables. PCA uses an orthogonal transformation to convert multi-channel audio content or signals of possibly correlated variables into a set of values of linearly uncorrelated signals as principal components.

However, it should be noted that the example embodiments disclosed herein are not intend to limit the how to perform component analysis, many other approaches as listed above which may be used to generate a plurality of components well distinguishing the variables. For example, independent component analysis can be used to separate signals into additive subcomponents, by assuming that the subcomponents are non-Gaussian signals and they are statistically independent from each other. Under this assumption, there are multiple ways to perform ICA to estimate the inverse of $C_{fn}(G_{fn})$ and then obtain the independent component by $s_{fn}=G_{fn}X_{fn}$.

For a typical component analysis, the input audio content has I channels, and it is assumed that the most principle component contains at most J top-dominant sources, which are distributed sparsely over the F spectral or frequency bins (for example, only one source exists in each bin). In accordance with the example embodiments disclosed herein, the model of each time-frequency (TF) tile in each channel may be defined as a sum of an ambient signal, one (or none) of the J most dominant sources and the remaining less-dominant sources, where the sources are weighted in accordance with their spatially perceived positions $C_{fn}$.

Figure 2:
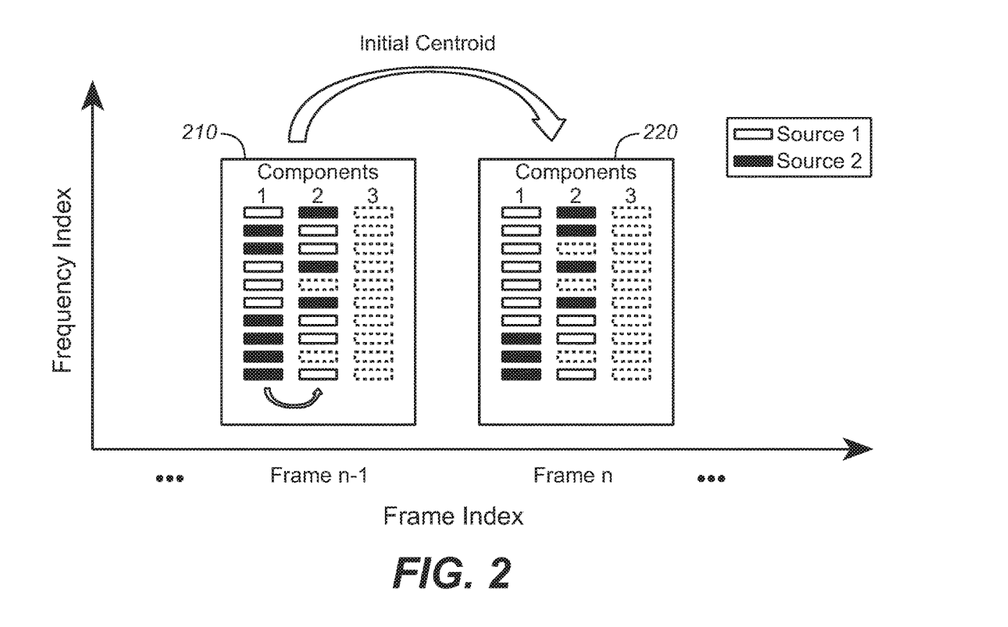
FIG. 2 illustrates an example of clustering of time-frequency tiles across components in accordance with an example embodiment.

FIG. 2 illustrates an example of clustering of time-frequency tiles across components in accordance with example embodiments. The horizontal axis of FIG. 2 represents time frames discretely shown, and the vertical axis represents frequency index. For each of the time frame for one channel, there are some components generated after performing the component analysis at the step S101. For example, in FIG. 2, a time frame 210 (*n*−1) including three components is shown, and each of the components includes a number of TF tiles each representing a frequency range. Similarly, a time frame 220 (*n*) including three components is shown to the right of the time frame 210 (*n*−1).

Returning to the flow chart as illustrated by FIG. 1, at step S102, in each component a plurality of dominant sources are generated with some of the TF tiles. A few steps can be used to perform the step S102. In one example embodiment disclosed herein, a first sub-step of the step S102 may include calculating eigenvalues and eigenvectors.

To generate the dominant sources, eigenvectors used for the component analysis may be needed. Based on the PCA model described above, for each frequency band f=1, . . . , F, a covariance matrix with respect to the input audio content is calculated, for example, by computing correlations among the channels. The resulting I*I covariance matrix may be smoothed with an appropriate time constant. Then eigenvector decomposition is performed to obtain eigenvalues $\lambda_{1,fn} > \lambda_{2,fn} > \ldots > \lambda_{I,fn}$. After eigenvalues are obtained, eigenvectors $v_{1,fn}, v_{2,fn}, \ldots, v_{I,fn}$ can be generated based on the eigenvalue decomposition (In this description, each eigenvector is denoted as a I-dimension row vector), where the first eigenvector $v_{1,fn}$ relates to the most dominant sources.

An eigenvector indicates the spatial information (e.g., direction) of a TF tile in the corresponding component. Hence, the TF tiles with eigenvectors close enough (e.g., within a predefined threshold in terms of distance or angle) may be assumed to belong to the same source. Those TF tiles with close directions may be clustered for constructing a spectral base for each of the sources. First, the rotation ambiguity of the eigenvectors can be removed by imposing the first element of each of the eigenvectors to be positive, for example, $v_k(1) \in R^+$. Then, a clustering and merging process can be applied. The clustering process may estimate J clusters, and the merging process can merge the clusters close enough to each other into one cluster (this can be measured by distances or angles between centroids of the clusters, with difference smaller than a predetermined threshold being "close enough"), such that the number of the clusters, especially dominant sources, after the merging process will be at most J. Further, TF tiles in each of the clusters can be used to construct the spectral base of each corresponding source. In a particular embodiment, a K-means clustering method may be applied in order to result in a more accurate spatial estimation of each of the sources. After the source construction, the number of the sources can be determined and these sources can be seen as the dominant sources.

Now a detailed explanation of the clustering process will be given in the following by reference to the example as illustrated by FIG. 2. For simplicity, only three components and two (latent) sources are illustrated in FIG. 2. After the rotation of the coordinate system by using the PCA approach for example, the eigenvectors of the TF tiles of the first component $v_{1,fn}$ can be analyzed and clustered into two groups, where white TF tiles belong to source 1, and black TF tiles belong to source 2. For estimating the first component, differences (distance or angle) from the eigenvectors of the TF tiles to initial cluster centers (e.g., as reference directions) can be obtained, where the initial cluster centers can be assigned with pre-defined values in the rotated coordinate system. Then an iterative refinement approach such as K-means is applied to partition the F TF tiles into J clusters in which each observation belongs to the cluster with the nearest mean. A cluster centroid of each group can be obtained after processing the first component.

Clustering of the second component can be then performed using the centroid estimated for the first component. Some constraints can be set that tiles of different components in the same frequency bin always belong to different sources. This can also be reflected by their cosine distance as they are orthogonal to each other as defined in the PCA approach.

Moreover, some process can be applied to alleviate ambiance noises. First, a tile can be excluded if it diverges from all of the centroids with differences higher than a certain threshold, which indicates that the tile may belong to an ambiance noise, as marked with dot-lined blocks in FIG. 2. Second, the clustering can be performed only on the most dominant components (e.g., top 2 or 3 components), or on weighted dominant components after an ambiance and direct separation. By performing the ambiance and direct separation, weighting gains can be estimated to be a directional ratio in a mixture signal. This process is described in detail by the Chinese Patent Application No. 201410357288.8 entitled "Decomposing Audio Signals," which is incorporated by reference herein in its entirety. In the following, the weighting gains are denoted as $g_{i,fn}$, which represents the portion of a TF tile of i-th component belonging to direct signals but not ambience signals.

In one example embodiment disclosed herein, in order to track each of the dominant sources over time, as shown in FIG. 2, the centroid estimated in previous frames (e.g., the time frame (n−1) in FIG. 2) can be calculated as an initial centroid for the clustering of TF tiles in the current frame (e.g., the time frame (n) in FIG. 2). In one example embodiment disclosed herein, a running-average of previous frames can be calculated as the initial centroid for the current frame.

In one example embodiment, a weighted K-means clustering method can be used to obtain more accurate cluster centroid estimation for each of the dominant sources. More weight may be assigned to TF tiles that are with higher energy for estimating the centroid. Meanwhile, more weight may be assigned to TF tiles with higher portion (reflected by $g_{k,fn}$) belonging to sources. Hence, the weighting gain in the weighted K-means $g_{k,fn} w_{k,fn}$ can be determined to be a product of $g_{k,fn}$ and a normalized eigenvalue as below:

$$g_{k,fn} w_{k,fn} = g_{k,fn} \log\left(2 * \frac{\lambda_{k,fn}}{\min_f(\lambda_{k,fn})}\right) \quad (2)$$

After the dominant sources are generated at the step S102, spatial parameters and spectral parameters are estimated based on the dominant sources for source separation at step S103.

Centroids of the eigenvectors can be estimated when performing the clustering process described above. Each source j can be assigned with a cluster of TF tiles with eigenvectors $\{v_{k,fn}\}_j$ or weighted eigenvectors $\{g_{k,fn} \cdot v_{k,fn}\}_j$. Each cluster is a nontrivial partition of the overall tile set. Therefore, the STFT of the spectral parameter of each source $\tilde{s}_{j,fn}$ can be reconstructed to be a sum of tiles as below:

$$\tilde{s}_{j,fn} = \{g_{k,fn} \cdot v_{k,fn}\}_j \cdot X_{fn} \quad (3)$$

The spatial metadata of each source can be estimated by using its corresponding centroid of the eigenvectors, denoted as $\{\bar{v}_n\}_j$. Renormalization may be applied by imposing Frobenius norm of $\{\bar{v}_n\}_j$, and scale $\tilde{s}_{j,fn}$ accordingly. This renormalization step can be used to eliminate trivial scale indeterminacies. As a result, the spatial parameter C can be estimated as:

$$C = [\{\bar{v}_n^H\}_j] \quad (4)$$

Figure 3:
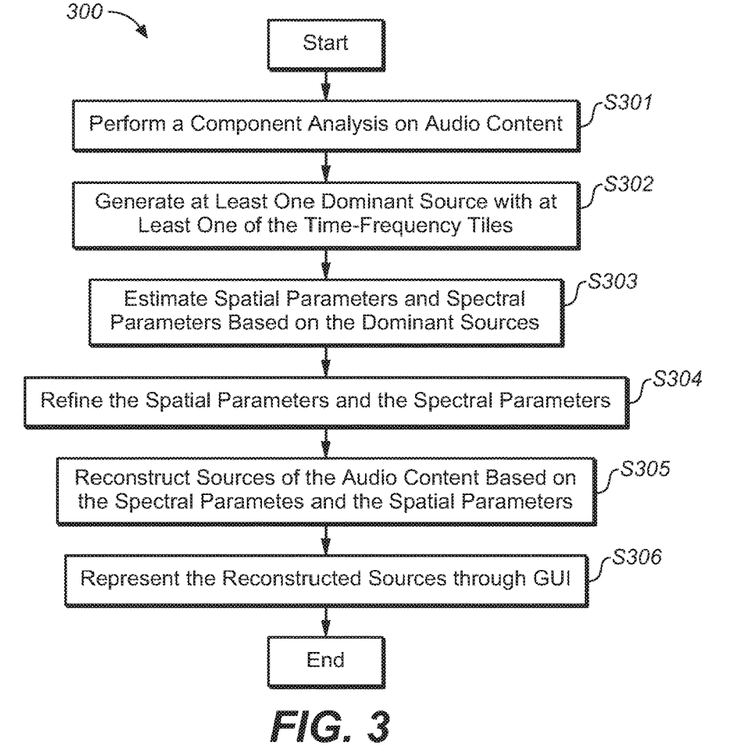
FIG. 3 illustrates a flowchart of a method for separating sources from audio content in accordance with another example embodiment.

FIG. 3 illustrates a flowchart of a method for separating sources from audio content in accordance with another example embodiment of the present invention. Steps S301 to S303 may correspond to the steps S101 to S103 described above by reference to FIG. 1, and thus detailed explanations will not be repeated for the steps S301 to S303. Although sources can be separated and audio content can be reconstructed once spatial parameters and spectral parameters are obtained, there are some additional approaches used to refine these parameters.

At step S304, the spectral parameters and the spatial parameters can be refined with some statistical approaches such as Gaussian Mixture Model (GMM) and Non-negative Matrix Factorization (NMF) in order to realize better result of the blind source separation (BSS).

In the GMM approach, each of the sources can be first represented as the realization of a random variable driven by a finite set of characteristic spectral shapes, for example, local power spectral densities (PSDs). Each local PSD describes some particular sound event. Under the GMM formalism, model $\Lambda_j$ for the jth audio source may be composed of κ states corresponding to κ local PSDs $\{\sigma_{k,f}^2\}$, k=1, 2, ..., κ. Since the modelling is performed for each of the sources, the j index will be omitted in the following for simplicity.

In one example embodiment, the STFT of the jth source can be viewed as random Gaussian complex vector with zero mean and diagonal covariance matrix $\Sigma_k = \text{diag}[\{\sigma_{k,f}^2\}_f]$. GMM is generally described in Simon Arberet, Alexey Ozerov, Remi Gribonaval, Frederic Bimbot, "Blind Spectral-GMM Estimation for Underdetermined Instantaneous Audio Source Separation", ICA, 2009, which is incorporated by reference herein in its entirety.

The GMM can then be parameterized as $\Lambda = \{u_k, \Sigma_k\}_k$, where $u_k \geq 0$ are the weights of each Gaussian density satisfying $\Sigma_k u_k = 1$. Altogether, the GMM probability distribution function of the STFT of the jth source can be written as:

$$P(s_n | \Lambda) = \sum_k u_k N(s_n; 0, \Sigma_k) \quad (5)$$

where P represents the probability distribution function (PDF) N(s; μ, Σ) represents the PDF of a complex Gaussian random vector s with mean vector μ and diagonal covariance matrix Σ, thus $$\Lambda = \underset{\Lambda}{\text{argmax}} P(\tilde{s}_{j,fn}, \Lambda) \quad (6)$$

GMM parameters $\Lambda_j$ for each source j are usually learned separately using a set of training data. In the particular embodiment, $\tilde{s}_{j,fn}$ estimated from the mix in Equation (3) is used. The GMM parameters are learned based on optimizing the maximum-likelihood (ML) criterion:

$$N(s_n; 0, \Sigma_k) = \Pi_f \frac{1}{\pi \sigma_{k,f}^2} \exp\left(-\frac{|s_{fn}|^2}{\sigma_{k,f}^2}\right).$$

In one example embodiment, the optimization of the ML criterion can be obtained with an expectation-maximization (EM) algorithm.

Therefore, the spectral GMMs of the sources can be obtained by $\Lambda = [\Lambda_j]_{j=1}^J$. The source separation can be performed with an adaptive Wiener filtering:

$$s_{j,fn} = \sum_K \gamma_{K,n} G_{K,f} x_{i,fn} \quad (7)$$

where K represents the mixture state: $K = [k_j]_{j=1}^J$, as a combination of all the source states $k_j \in \{1, 2, \ldots, \kappa\}$, and $\gamma_{K,n}$ represents the state probability at frame n satisfying $\Sigma_K \gamma_{K,n} = 1$ and:

$$\gamma_{K,n} = P(K | x_{i,fn}; A, \Lambda) \propto u_K \prod_f N(x_{i,fn}; 0, A \cdot \Sigma_{K,f} \cdot A^H) \quad (8)$$

$$\Sigma_{K,f} = \text{diag}[\{\sigma_{k,f}^2\}]_{j=1}^J \quad (9)$$

Therefore the Wiener filter $G_{K,f}$ can be given by:

$$G_{K,f} = \Sigma_{K,f} A^H (A \Sigma_{K,f} A^H)^{-1} \quad (10)$$

where A is a mixing matrix and it has been initialized by C as derived in equation (4).

In Equation (7), it is of complexity $o(\kappa^J)$ to calculate all the K mixture state as a combination of all the source states. In order to reduce the complexity to be linear to the source number $o(\kappa \cdot J)$, the most likely state $\tilde{k}_j$ of each source at time n can be estimated by:

$$\tilde{k}_j = \underset{\tilde{k}_j}{\text{argmax}} P(k | \tilde{s}_{j,fn}, \Lambda) \quad (11)$$

where $\tilde{s}_{j,fn}$ represents the PCA-based source estimation calculated by Equation (3). Hence, the mixture state could be simplified as one $\tilde{K} = [\tilde{k}_j]_{j=1}^J$ rather than all possible state combinations.

In one example embodiment disclosed herein, in the NMF approach, the power spectrogram of source j with NMF model $\{W_j, H_j\}$ can be modeled, such that $|S_j|^2 \approx W_j H_j$. This NMF-based model can be well suited to polyphony as it basically takes the source to be a sum of elementary components with characteristic spectral signatures.

An Expectation Maximization (EM) algorithm may be applied to iteratively estimate the source parameters $\{W_j, H_j\}$ and mixing parameters $A_{fn}$. In the conventional method, these parameters are initialized with random data, and it is reported that the algorithm can be very slow and it converges to a local maximum depending on the initial values.

In one example embodiment, the parameters for the EM estimation are calculated with the pre-learned sources in the below steps.

Initialization Steps:
1. Calculate the covariance matrix of the sources based on the reconstructed STFT in Equation (3) of the spectral parameter of each source $\tilde{s}_{j,fn}$:

$$\hat{R}_{SS,fn} = \tilde{s}_{fn} \tilde{s}_{fn}^H \quad (12)$$

2. Determine the power spectrogram of the sources by the diagonal elements of $\hat{R}_{SS,fn}$:

$$\hat{\Sigma}_{s,fn} = \text{diag}(\hat{R}_{SS,fn}) \quad (13)$$

3. Based on the NMF model, $\hat{\Sigma}_{Sj,fn} \triangleq \text{diag}([W_{j,fk} H_{j,kn}])$, initialize the non-negative matrixes of the NMF model for each source j:

$$W_j = W_j \frac{(W_j H_j)^{-2} \hat{\Sigma}_{s_j} * H_j^H}{(W_j H_j)^{-1} * H_j^H} \quad (14)$$

$$H_j = H_j \frac{W_j^H * \hat{\Sigma}_{s_j} (W_j H_j)^{-2}}{W_j^H * (W_j H_j)^{-1}} \quad (15)$$

4. Initialize the mixing matrix $A_{fn}$ by C via Equation (4).
5. Normalize the mixing and spectrum parameters $A_{fn}$, $\{W_j, H_j\}$ by imposing $\Sigma_i |A_{i,j,fn}|^2 = 1$, and scale $\{W_j, H_j\}$ accordingly. This step eliminates trivial scale indeterminacies.
6. Then go to the iterative EM estimation of which one iteration is described as below.

Expectation (One Step):
1. Refine the sources' power spectrum $\hat{\Sigma}_{sj,fn} = \text{diag}([W_{j,fk} H_{j,kn}])$,
2. Estimate the inverse mixing matrix $G_{f,n}$ as below:

$$\hat{G}_{f,n} = \begin{cases} \hat{\Sigma}_{s,fn} A_{fn}^H (A_{fn} \hat{\Sigma}_{s,fn} A_{fn}^H + \Sigma_{b,f})^{-1}, & (J \geq I) \quad (16) \\ (A_{fn}^H \Sigma_{b,f}^{-1} A_{fn} + \hat{\Sigma}_{s,fn}^{-1})^{-1} A_{fn}^H \Sigma_{b,fn}^{-1}, & (J < I) \quad (17) \end{cases}$$

Note that in an underdetermined condition (J≥I), Equation (16) can be applied, and in an over-determined condition (J<I), Equation (17) can be applied as the estimated covariance matrix $(A_{fn}\hat{\Sigma}_{s,fn}A_{fn}^H + \Sigma_{b,f})$ may not be invertible when J<I.

3. Calculate the covariance matrix of the audio sources $\hat{R}_{s,fn}$ and the cross covariance matrices $\hat{R}_{XS,fn}$ as below:

$$\hat{R}_{S,fn} = \hat{G}_{f,n}(R_{X,fn} - \Lambda_{b,f})\hat{G}_{f,n}^H \quad (18)$$

$$\hat{R}_{XS,fn} = X_{f,n}\hat{s}_{f,n}^H \approx R_{X,fn}\hat{G}_{f,n}^H \quad (19)$$

4. Update the sources' power spectrum $\hat{\Sigma}_{s,fn}$ via Equation (13);

Maximization (One Step):
1. Update the mixing parameters $A_{fn}$ as below:

$$A_{fn} = \hat{R}_{XS,fn}\hat{R}_{S,fn}^{-1} \quad (20)$$

2. Update the spectrum parameters via Equations (14) and (15);
3. Re-normalize the parameters $A_{fn}$, $\{W_j, H_j\}$ by imposing $\Sigma_i |A_{ij,fn}|^2 = 1$, and scale $\{W_j, H_j\}$ accordingly. This step eliminates trivial scale indeterminacies.

Compared with a conventional EM iterative process which assigns randomly selected values for the mixing parameter and the spectral parameter, the example embodiments disclosed herein calculates initial values for at least one of the mixing parameter and the spectral parameter as described above, facilitating the performance of the refinement of these parameters by the EM iterative process in terms of speed and accuracy. The example embodiments disclosed herein enables statistical approaches to avoid the issue of scarcity of representative training data for wide classes of audio content (e.g., music sounds, movie sound effects, etc.). It also allows to specialize a source model to the particular properties of a given sources in a given mix (e.g., a special sound effect adopted in a movie, or a particular instrument or combination of instruments). The example embodiments disclosed herein is also not affected by particular properties in the target data such as the type of microphone, the room acoustic property, the channel distortion, and the like. Furthermore, faster convergence speed can be achieved, and the computational complexity can be controlled.

After the spatial parameters and the spectral parameters are refined by approaches such as GMM and NMF as described above, sources of the audio content can be reconstructed via Wiener Filtering based on the spatial parameters and the spectral parameters at step S305 illustrated in FIG. 3. The reconstructed (dominant) sources $\tilde{y}_{ij,fn}$, along with their corresponding positions reflected in A will be utilized for user-assisted source extraction as described below.

Figure 4:
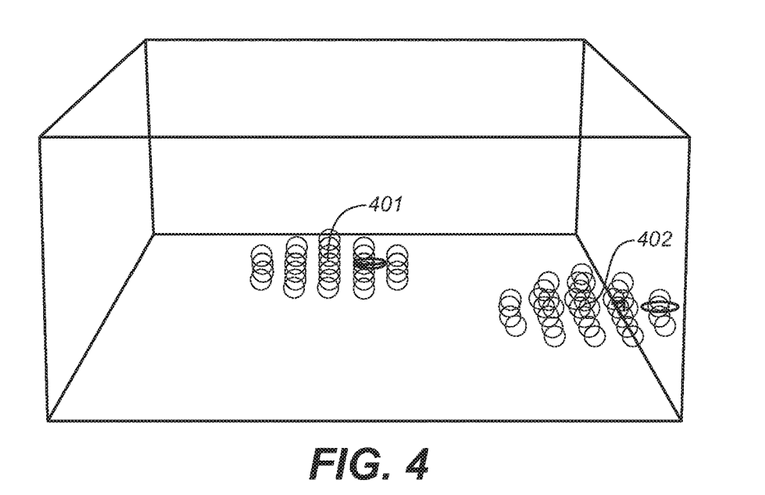
FIG. 4 illustrates an illustration of graphical user interface (GUI) for representing sources in a space in accordance with an example embodiment.

At step S306, the reconstructed sources can be represented through a graphical user interface (GUI). In other words, the reconstructed sources $\tilde{y}_{ij,fn}$ and their corresponding positions (reflected in A) can be shown to the users by the GUI. An example GUI can be illustrated in FIG. 4, where the users are able to observe spatial positions of the (dominant) sources, listen to their sound by clicking on them, select one or more target sources which are intended to be extracted, and mark the start and stop time. For example, as shown in FIG. 4, a 3D space may be defined by positions of multiple speakers. However, it should be understood that some systems such as a 7.1.4 surround system are able to construct a 3D space while some other systems such as a 5.1 surround system can only construct a 2D space. For the latter case, the audio sources may be displayed by the GUI at the bottom surface of the 3D space which indicates that there is no information provided with regard to height.

With reference to FIG. 4, a reconstructed source 401 is shown to the left of another reconstructed source 402, and the user can click on either one of the reconstructed sources 401 and 402 to listen to it for further processing of the audio content. As shown in FIG. 4, each of the reconstructed sources 401 and 402 is simulated to have a spatial position represented by a number of circles with different darkness. A darker circle may represent a higher intensity of the source which may be construed as closer to the spatial position of the source. On the other hand, a lighter circle may represent a lower intensity of the source which may then be construed as far from the spatial position of the source. FIG. 4 only shows an example moment of the simulation of the source separation, and the distribution of the reconstructed sources may vary over time. Additionally, the spectral information may be displayed by different colors. For example, lower frequency sources may be assigned with blue tone while higher frequency sources may be assigned with red tone.

The resultant output of the source selection through a GUI as "intended source snapshots" can be referred, which includes at least one of the following information about the intended source: 1) spectral structure, 2) spatial position, and 3) activation time (onset and offset time of the source). As a result, an informed source separation approach can be applied with explicit structure/position/time constraints. The intended source is enforced during the refinement process. This can be a significant gain in terms of convergence performance and speed compared with the standard NMF/GMM approaches using a chaotic initialization.

With the GUI involved in the example embodiments disclosed herein, it allows extracting specific sources on demand, meaning that the estimated sources and their corresponding positions can be presented through the GUI, so that the users are able to select intended sources through their sounds and/or positions, before further separation and refinement iterations are applied.

With the novel BSS framework described above, the latent sources in the mixed audio can be learned by using component analysis as illustrated in the present invention.

Because information about the latent sources is estimated based on each cluster, the spatial and spectral information can be obtained, and thus no training data or prior information is necessary for statistical models such as GMM and NMF approaches. In other words, the present invention is advantageous over the conventional BSS methods requiring training data, because it utilizes a fully blind approach in the sense that no parameter needs to be trained beforehand and thus no training data is required.

Figure 5:
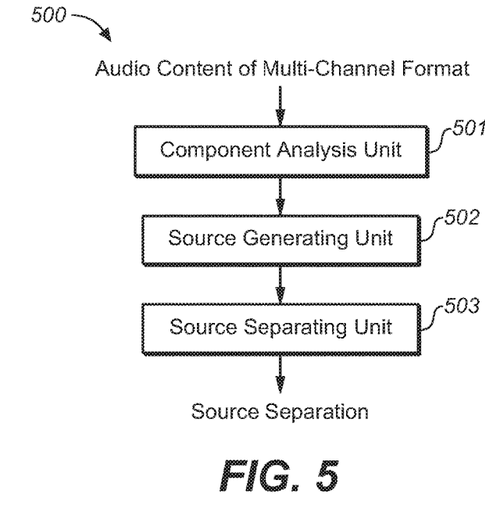
FIG. 5 illustrates a system for separating sources from audio content in accordance with an example embodiment.

FIG. 5 illustrates a system 500 for separating sources from audio content in accordance with an example embodiment of the present invention. As shown, the system 500 comprises a component analysis unit 501 configured to perform a component analysis on the audio content for each of the plurality of channels to generate a plurality of components, each of the plurality of components comprising a plurality of time-frequency tiles in full frequency band. The component analysis unit 501 receives audio content of multi-channel format from input. The system 500 also comprises a source generating unit 502 configured to generate at least one dominant source with at least one of the time-frequency tiles from the plurality of the components, and a source separating unit 503 configured to separate the sources from the audio content by estimating spatial parameters and spectral parameters based on the dominant source.

In some example embodiments, the source generating unit 502 may comprise a clustering unit configured to cluster a plurality of directions into at least one group, each group comprising a plurality of time-frequency tiles, the plurality of directions being generated from the plurality of components; and a tracking unit configured to generate the dominant source by tracking the group over time. In example embodiments disclosed herein, the clustering unit may be configured to cluster the directions with differences to an initial value within a predefined clustering threshold in all of the components into the group. Further in example embodiments disclosed herein, the time-frequency tile clustering unit may comprise a centroid estimating unit configured to estimate a centroid for each of the clusters based on the initial value and at least one of a directness of the plurality of time-frequency tiles and an energy level of the plurality of time-frequency tiles. In some example embodiments disclosed herein, the tracking unit may comprise at least one of: a previous centroid assigning unit configured to assign the estimated centroid for a previous time frame as the initial value for a current time frame; or a running-average centroid assigning unit configured to assign running-average centroids estimated in previous time frames as the initial value for a current time frame.

In some other example embodiment, the source separating unit 503 may comprise a centroid estimating unit configured to estimate a centroid of the directions for the dominant source; a spatial source separating unit configured to estimate the spatial parameters of the time-frequency tiles within each of the plurality of the components based on the centroids; and a spectral source separating unit configured to estimate the spectral parameters of the time-frequency tiles within each of the plurality of the components based on the centroids. In some example embodiments disclosed herein, the source separating unit 503 may comprises: a Gaussian mixture model parameter calculating unit configured to calculate Gaussian mixture model parameters based on the spectral parameters; and a state estimating unit configured to estimate a most likely state for each of the sources at each time frame based on the Gaussian mixture model parameters, the spatial parameters and the spectral parameters. Further, the source separating unit 503 may comprise: an initialization unit configured to perform an initialization process for mixing parameters and spectrum parameters; and a parameter updating unit configured to update the spectrum parameters and the mixing parameters by an EM iterative process. Yet in example embodiments disclosed herein, the initialization unit may comprise at least one of: mixing parameter initializing unit configured to initialize mixing parameters based on the spatial parameters; or spectrum parameter calculating unit configured to calculate spectrum parameters based on the spectral parameters.

In some example embodiment, the system may comprise a source reconstructing unit configured to reconstruct sources of the audio content based on the spectral parameters and the spatial parameters for the dominant source; and a source representing unit configured to represent the reconstructed sources through a graphical user interface.

For the sake of clarity, some optional components of the system 500 are not shown in FIG. 5. However, it should be appreciated that the features as described above with reference to FIGS. 1-4 are all applicable to the system 500. Moreover, the components of the system 500 may be a hardware module or a software unit module. For example, in some embodiments, the system 500 may be implemented partially or completely with software and/or firmware, for example, implemented as a computer program product embodied in a computer readable medium. Alternatively or additionally, the system 500 may be implemented partially or completely based on hardware, for example, as an integrated circuit (IC), an application-specific integrated circuit (ASIC), a system on chip (SOC), a field programmable gate array (FPGA), and so forth. The scope of the present invention is not limited in this regard.

Figure 6:
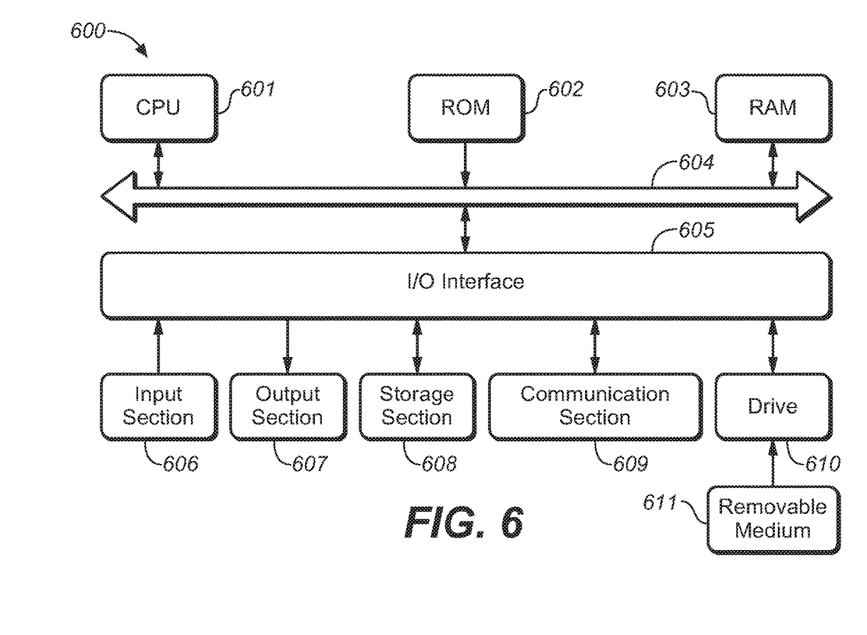
FIG. 6 illustrates a block diagram of an example computer system suitable for the implementing example embodiments disclosed herein.

FIG. 6 shows a block diagram of an example computer system 600 suitable for implementing example embodiments disclosed herein. As shown, the computer system 600 comprises a central processing unit (CPU) 601 which is capable of performing various processes in accordance with a program stored in a read only memory (ROM) 602 or a program loaded from a storage section 608 to a random access memory (RAM) 603. In the RAM 603, data required when the CPU 601 performs the various processes or the like is also stored as required. The CPU 601, the ROM 602 and the RAM 603 are connected to one another via a bus 604. An input/output (I/O) interface 605 is also connected to the bus 604.

The following components are connected to the I/O interface 605: an input section 606 including a keyboard, a mouse, or the like; an output section 607 including a display, such as a cathode ray tube (CRT), a liquid crystal display (LCD), or the like, and a speaker or the like; the storage section 608 including a hard disk or the like; and a communication section 609 including a network interface card such as a LAN card, a modem, or the like. The communication section 609 performs a communication process via the network such as the internet. A drive 610 is also connected to the I/O interface 605 as required. A removable medium 611, such as a magnetic disk, an optical disk, a magneto-optical disk, a semiconductor memory, or the like, is mounted on the drive 610 as required, so that a computer program read therefrom is installed into the storage section 608 as required.

Specifically, in accordance with the example embodiments disclosed herein, the processes described above with reference to FIGS. 1-4 may be implemented as computer software programs. For example, example embodiments disclosed herein comprise a computer program product including a computer program tangibly embodied on a machine readable medium, the computer program including program code for performing methods 100 and/or 300. In such embodiments, the computer program may be downloaded and mounted from the network via the communication section 609, and/or installed from the removable medium 611.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed among one or more remote computers or servers.

Further, while operations are depicted in a particular order, this should not be understood as requiring that such operations be performed in the particular order shown or in a sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other example embodiments set forth herein will come to mind of one skilled in the art to which these embodiments pertain to having the benefit of the teachings presented in the foregoing descriptions and the drawings.

Accordingly, the example embodiments disclosed herein may be embodied in any of the forms described herein. For example, the following enumerated example embodiments (EEEs) describe some structures, features, and functionalities of some aspects of the present invention.

EEE 1. A method for separating sources from mixture signals composed of a plurality of audio channels (at least two different channels), comprising:

obtaining a set of components that are weakly correlated/uncorrelated (or weakly dependent/independent) to each other, the set of components generated based on the plurality of audio signals;

constructing a set of most dominant directional sources with a subset of time-frequency tiles of the components, by exploiting the spatial consistency of the subset of these tiles of the components;

estimating source parameters based on the constructed most dominant directional sources, where the source parameters includes spatial parameters (mixing matrix) and source spectral parameters, specializing the statistical behavior of the sources in a target mix, so that these parameters accounts for variability including at least recording and coding variability;

initializing source models for source separation iterations to accelerate the convergence speed, to keep the iterations from converging to a local maximum due to any chaotic initial value, and/or to enforce a particular convergence target.

EEE 2. A method according to EEE 1, wherein determining the set of most dominant directional sources comprises:

estimating the spatial parameters of TF tiles of the set of components;

clustering the TF tiles with the spatial parameters, and merging very close clusters;

tracking each cluster along time;

renormalizing the spatial parameters and spectral parameters, and constructing the most dominant directional sources with the clusters.

EEE 3. A method according to EEE 2, wherein estimating the spatial parameters of TF tiles in each component comprises at least one of the following:

calculating eigenvalue decomposition (for PCA-based method) of the covariance matrix of the plurality of audio signals, and assigning the eigenvectors of each PCA components' TF tiles as their spatial parameter, and eliminating the rotation ambiguity;

estimating the inverse mixing parameters (for ICA-based method) to be the spatial parameters of each ICA component, and eliminating the rotation ambiguity.

EEE 4. A method according to EEE 2, wherein clustering the TF tiles with the spatial parameters comprises:

for the most dominant component, calculating the distances of TF tiles with their spatial parameters, clustering the tiles and estimating the cluster centroid;

performing the following for a few iterations: for the less dominant component, clustering the tiles with the previously estimated centroid, and constraints can be added that a TF tile of different components always belong to different clusters.

EEE 5. A method according to EEE 4, wherein the iterations are performed on at least one of the following:

The most dominant components;

The weighted components applied with gains by direct and ambiance separation.

EEE 6. A method according to EEE 2, wherein clustering the TF tiles with the spatial parameters further comprises:

using a weighted K-means clustering method, where the weighting factor is jointly determined by the energy of TF tiles and the directional gain estimation by direct and ambiance separation.

EEE 7. A method according to EEE 2, wherein tracking each cluster along time comprises at least one of the following:

taking the centroid estimated in the previous frame as an initial centroid for the current clustering;

taking the running-average of the centroids estimated in the previous frames as an initial centroid for the current clustering.

EEE 8. A method according to EEE 1, where constructing the set of most dominant directional sources with a subset of time-frequency tiles of the components, comprises:

assigning each source one cluster of TF tiles along with their (weighted) spatial parameters, which is a nontrivial partition of all the tiles;

estimating the source's spatial parameter to be its corresponding cluster centroid;

recovering the source spectrum by applying its corresponding spatial parameters to the spectrum of the plurality of audio signals.

EEE 9. A method according to EEE 1, where estimating source parameters based on the constructed most dominant directional sources, comprises at least one of the following:

using the recovered source spectrum to calculate the GMM parameters based on optimizing the maximum-likelihood (ML) criterion;

estimating the most likely state of each source at each time frame based on optimizing another ML criterion, to accelerate the calculation by reducing the number of possible GMM states.

EEE 10. A method according to EEE 1, where estimating source parameters based on the constructed most dominant directional sources, comprises at least one of the following:

for the first iteration of the expectation step, calculating the covariance matrix using the recovered source spectrum, thus the sources' power spectrogram comprises the matrix's diagonal elements;

for the first iteration of the maximization step, modelling the sources' power spectrogram using NMF, initiating the non-negative matrixes for each source, and initiating the mixing matrix using the weighted eigenvector;

normalizing the source parameters to eliminate scale indeterminacies;

continuing with the next EM iteration for the NMF-based BSS with the above initialized model parameters.

EEE 11. A method according to EEE 1, where initializing source models for source separation iterations to enforce a particular convergence target, comprises at least one of the following:

representing the reconstructed sounds and positions (reflected by the mixing parameters) of each source through a graphical user interface (GUI);

creating intended source snapshots through the GUI after users select one or more target sources and/or mark their activation time;

applying informed source separation iterations to further refine the target sources with at least one of the explicit structure/position/time constraints based on the intended source snapshots.

It will be appreciated that the example embodiments disclosed herein are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method of separating sources from audio content, the audio content being of a multi-channel format based on a plurality of channels, the method comprising:

performing a principal component analysis, PCA, on the audio content for each frequency band using the plurality of channels to generate a plurality of components, each of the plurality of components comprising a plurality of time-frequency tiles in full frequency band;

generating at least one dominant source with at least one of the time-frequency tiles from the plurality of the components; and separating the sources from the audio content by estimating spatial parameters and spectral parameters based on the dominant source, wherein generating at least one dominant source comprises:

clustering a plurality of eigenvectors into at least one group, each group comprising a plurality of time-frequency tiles, the plurality of eigenvectors being generated from the plurality of PCA components; and generating the dominant source by tracking the group over time.

2. The method according to claim 1, wherein clustering the eigenvectors into at least one group comprises:

clustering the eigenvectors with differences to an initial value within a predefined clustering threshold in all of the components into the group.

3. The method according to claim 2, wherein clustering the eigenvectors into at least one group comprises:

estimating a centroid for the group based on the initial value and at least one of a directness of the plurality of time-frequency tiles and an energy level of the plurality of time-frequency tiles.

4. The method according to claim 3, wherein generating the dominant source by tracking the group over time comprises at least one of:

assigning the estimated centroid for a previous time frame as the initial value for a current time frame; or assigning running-average centroids estimated in previous time frames as the initial value for a current time frame.

5. The method according to claim 1, wherein separating the sources from the audio content by estimating spatial parameters and spectral parameters comprises:

estimating a centroid of the eigenvectors for the dominant source;

estimating the spatial parameters of the time-frequency tiles within each of the plurality of the components based on the centroids; and estimating the spectral parameters of the time-frequency tiles within each of the plurality of the components based on the centroids.

6. The method according to claim 5, wherein separating the sources from the audio content by estimating spatial parameters and spectral parameters further comprises:

calculating Gaussian mixture model parameters based on the spectral parameters; and estimating a most likely state for each of the sources at each time frame based on the Gaussian mixture model parameters, the spatial parameters and the spectral parameters.

7. The method according to claim 5, wherein separating the sources from the audio content by estimating spatial parameters and spectral parameters further comprises:

performing an initialization process for mixing parameters and spectrum parameters; and updating the spectrum parameters and the mixing parameters by an EM iterative process.

8. The method according to claim 7, wherein performing the initialization process comprises at least one of:

initializing mixing parameters based on the spatial parameters; or calculating spectrum parameters based on the spectral parameters.

9. The method according to claim 1, wherein the method further comprises:

reconstructing sources of the audio content based on the spectral parameters and the spatial parameters for the dominant source; and representing the reconstructed sources through a graphical user interface.

10. A system for separating sources from audio content, the audio content being of a multi-channel format based on a plurality of channels, the system comprising:

a component analysis unit configured to perform a principal component analysis, PCA, on the audio content for each frequency band using the plurality of channels to generate a plurality of components, each of the plurality of components comprising a plurality of time-frequency tiles in full frequency band;

a source generating unit configured to generate at least one dominant source with at least one of the time-frequency tiles from the plurality of the components; and a source separating unit configured to separate the sources from the audio content by estimating spatial parameters and spectral parameters based on the dominant source, wherein the source generating unit comprises:

a clustering unit configured to cluster a plurality of eigenvectors into at least one group, each group comprising a plurality of time-frequency tiles, the plurality of eigenvectors being generated from the plurality of PCA components; and a tracking unit configured to generate the dominant source by tracking the group over time.

11. The system according to claim 10, wherein the clustering unit is configured to cluster the eigenvectors with differences to an initial value within a predefined clustering threshold in all of the components into the group.

12. The system according to claim 11, wherein the clustering unit further comprises:

a centroid estimating unit configured to estimate a centroid for each of the clusters based on the initial value and at least one of a directness of the plurality of time-frequency tiles and an energy level of the plurality of time-frequency tiles.

13. The system according to claim 12, wherein the tracking unit comprises at least one of:

a previous centroid assigning unit configured to assign the estimated centroid for a previous time frame as the initial value for a current time frame; or a running-average centroid assigning unit configured to assign running-average centroids estimated in previous time frames as the initial value for a current time frame.

14. The system according to claim 10, wherein the source separating unit comprises:

a centroid estimating unit configured to estimate a centroid of the eigenvectors for the dominant source;

a spatial source separating unit configured to estimate the spatial parameters of the time-frequency tiles within each of the plurality of the components based on the centroids; and a spectral source separating unit configured to estimate the spectral parameters of the time-frequency tiles within each of the plurality of the components based on the centroids.

15. The system according to claim 14, wherein the source separating unit further comprises:

a Gaussian mixture model parameter calculating unit configured to calculate Gaussian mixture model parameters based on the spectral parameters; and a state estimating unit configured to estimate a most likely state for each of the sources at each time frame based on the Gaussian mixture model parameters, the spatial parameters and the spectral parameters.

16. The system according to claim 14, wherein the source separating unit further comprises:

an initialization unit configured to perform an initialization process for mixing parameters and spectrum parameters; and a parameter updating unit configured to update the spectrum parameters and the mixing parameters by an EM iterative process.

17. The system according to claim 16, wherein the initialization unit comprises at least one of:

mixing parameter initializing unit configured to initialize mixing parameters based on the spatial parameters; or spectrum parameter calculating unit configured to calculate spectrum parameters based on the spectral parameters.

18. The system according to claim 10, wherein the system further comprises:

a source reconstructing unit configured to reconstruct sources of the audio content based on the spectral parameters and the spatial parameters for the dominant source; and a source representing unit configured to represent the reconstructed sources through a graphical user interface.

19. A computer program product for separating sources from audio content, the computer program product being tangibly stored on a non-transient computer-readable medium and comprising machine executable instructions which, when executed, cause the machine to perform steps of the method according to claim 1.

* * * * *